Patented June 15, 1943

2,321,761

UNITED STATES PATENT OFFICE 2,321,761

PROCESS FOR PLUGGING FORMATIONS

Clyde H. Mathis and Carl Rampacek, Bartlesville, Okla., assignors to Phillips Petroleum Company, a corporation of Delaware No Drawing. Application August 5, 1940, Serial No. 351,544

10 Claims. (Cl. 166—22)

This invention relates to a process for the plugging of openings in tanks, walls, dams, etc., plugging formations, particularly those encountered in oil or gas wells and the coating of surfaces.

The invention relates more particularly to the use of an essentially non-acid liquid material which, after in place will undergo condensation, association, polymerization or other chemical reactions to form a resin that will prevent the flow of water, oil and/or gas from or into the formations into which the resinous material has been injected, and generally serves as a sealing agent against flow into or out of tanks, walls, dams and/or from or through any surface whatsoever.

In the drilling of oil and gas wells, water formations are usually encountered during drilling and before the productive oil and gas horizon is contacted. To shut out the water from the bore hole, it is necessary to run steel casing into the well, but in many instances these waters are corrosive and in contacting the steel casing will soon corrode the same allowing the encroachment of water into the well. Also, after an oil well is completed, bottom hole water or water and/or gas is often produced from formations adjacent to the oil saturated formation. This water must be produced from the well bore along with the oil and it materially increases the lifting costs to raise the oil to the surface of the ground since it cuts down the amount of oil which can be produced and further increases the treating costs of the oil when it arrives on the surface of the ground since water must be removed from the oil before it can be processed. In some cases, the production of gas with oil is undesirable. Frequently water is produced with gas in gas wells, which water may be corrosive or exhibit other undesirable features as well as causing high gas-water separating costs. It is often desirable to eliminate the production of water and gas from oil wells from the standpoint of economics.

There are many wells producing from lime or dolomitic formations which produce large quantities of water with the oil even though there is a vast quantity of oil remaining in the reservoir. It is the general opinion that a major portion of this water enters from the lower section of the well bore.

Heretofore, cement and other similar materials have been used in water and gas plugging operations, but these materials offer only a partial solution of these problems, for it is only in the very permeable formations that cement can be forced even under the extreme pressure of several thousands of pounds.

In a co-pending application, Serial No. 200,766, by Lerch et al., a resin-forming material for plugging water in formations encountered in oil wells is described. This resin is applicable to use in formations essentially free of limestone or dolomitic materials.

The primary object of this invention is to introduce an essentially acid-free liquid resin-forming material into the formation desired to be plugged in such a manner that a resin by condensation, association, polymerization or other chemical reaction will be formed, thereby plugging the channels in the water and/or gas bearing formation and preventing said water and/or gas from entering the well bore.

Another object of this invention is to provide a process for the sealing of tank bottoms, walls, dam faces, etc., by placing an essentially acid-free liquid resin-forming material on the surface in such a manner that the resin by condensation, association, polymerization or other chemical reaction will be formed thereon.

Still other objects and advantages will appear to those skilled in the art from a careful study of the disclosure which follows.

Our invention applies to the use of an essentially acid-free liquid resin-forming material which is a homogeneous fluid capable of entering the pores of the formation, and after a predetermined time, will undergo polymerization, association or condensation to form an impermeable solid within the pores of the formation rather than on the surface thereof as cements do.

The type of improved resin disclosed in this invention is that formed from a urethane, furfural, and a catalyst, which mixture will remain fluid for a time sufficient to be injected into the formation and then undergo polymerization or condensation to form an insoluble and impermeable plug within the pores of the formation being plugged. The setting time of these resin-forming mixtures may be controlled by the relative amount of catalyst used, for example, the greater the concentration of the catalyst the more rapid is the set. Temperature affects the time of set, but since the bottom hole temperature in any given well is a fixed condition, the amount of catalyst is used to give the desired setting time for any bottom hole temperature. A large number of wells producing from limestone are of relatively low bottom hole temperature (usually below 150° F.) and this invention describes a non-acidic resin-forming material capable of setting at low temperatures (below 150° F.) and adaptable to use in lime formations as well as in sand, shale, etc.

The following examples illustrate the method of preparation of our liquid resin-forming material.

Example I 415 pounds isobutyl urethane are dissolved in 100 gallons furfural and to this solution is added 6 gallons of hydrochloric acid (specific gravity 1.145) solution containing 10 per cent copper acetate. This mixture sets to a hard resin in 15 minutes at 150° F., or in 45 minutes at 110° F. This resin-forming mixture has a pH of approximately 7 and is therefore non-reactive to limestone or dolomite.

If a longer setting time is desired it may be obtained by using less acid or by using the above described amount of acid and neutralizing a portion thereof to reduce the acidity. The resin is capable of forming even when the pH of the liquid mixture is higher than 11.

Example II

The resin-forming mixture prepared as in Example I, is allowed to stand 20 to 30 minutes and at the end of said time 3½ gallons of 30 per cent by weight sodium hydroxide solution is added with stirring. The pH of the resulting solution is approximately 11. This mixture solidifies in 1¾ hours at 150° F. or in 10 hours at 110° F.

Example III 50 gallons of a solution containing hexyl to decyl urethanes, a du Pont product known as B-24 distilled urethanes, and 100 gallons furfural are well mixed. To this mixture is added with stirring 1.5 gallons hydrochloric acid (specific gravity 1.19) solution containing 10 per cent copper acetate. This acid containing mixture was not reactive to limestone, and set to a hard resin in 1½ hours at 110° F.

It is desirable to use a freshly prepared solution of furfural and urethane, though it is not intended to limit our invention in this respect. Since the solution of urethane in furfural is endothermic, the dissolving is facilitated by gently warming the solution. During the mixing of the hydrochloric acid catalyst into the furfural-urethane solution, the temperature of the solution should be maintained below 110° F. and preferably above 90° F. Variations in these temperatures may be made without affecting the utility of our resin; however, the setting time and resin quality are altered. The ratio of the urethane or urethane mixture to furfural may be varied without departing from the scope of our invention. The proportions of these materials cited in the foregoing examples are representative of optimum conditions.

Copper acetate is not an essential ingredient of the hydrochloric acid catalytic solution, but its presence contributes to the quality of the resin. Copper sulfate or other soluble copper salts may be substituted for the copper acetate. Other members of the urethanes may be used in place of the isobutyl urethane and the hexyl to decyl urethane mixture. The isobutyl urethane is suggested because it is potentially available.

The application of the material to the well bore may be directly through the casing, tubing, bailer or any conventional method suitable for lowering the liquid into the well. If necessary, pressure may be applied through the tubing by positive pump action after a well packer has been set between the tubing and casing above the formation where treatment is desired. After sufficient resin-forming material has been added to the formation, a plug of suitable material may be used to separate the resin-forming material from the oil or water which will follow in the tubing to drive the resin-forming material out into the formation to be plugged and thus insure that the resin-forming material will not set up in the tubing. Pressure will be held on the formation until the liquid material has had sufficient time to form a solid and impermeable resin, plugging the formation.

The setting time of the resin may be varied to fit the particular application, the governing factors being: The depth or extent of the formation, the permeability, porosity and chemical nature of the formation and the available method of application. The setting time is best controlled by the quantity of catalyst present in the mixture.

The resin-forming mixtures as described in the foregoing examples have a specific gravity of approximately 1.08. The bottom hole brines encountered in wells in western Kansas lime formations have specific gravities of about 1.04. Since our resin-forming liquids are heavier, volume for volume, than said brines, we ordinarily experience no difficulty in sealing off bottom hole water or brines in these wells.

In conclusion, our invention specifically relates to the use of liquid resin-forming materials with the chemical reaction definitely controlled to produce a solid resin within a definite time limit so that sufficient time may be allowed to prepare and to introduce the resin-forming material into a well, tank, or to any surface to be treated, before the same resinifies or solidifies. Certain chemical mixtures of materials which will react in this manner have been specifically mentioned but it is to be understood that other compounds of mixtures containing the same physical and chemical properties as those specifically mentioned will react in the same manner as those mentioned above and that various changes in the choice and amounts of materials used can be made without departing from the spirit of our invention or the scope of the subjoined claims.

We claim:
1. A method of plugging formations in wells including the step of impregnating the formation with a mixture of furfural, a urethane and a hydrochloric acid catalyst, the mixture having a pH of approximately 7, and controlling the time of setting of the mixture by the amount of hydrochloric acid catalyst used.

2. A method of plugging formations in wells including the steps of impregnating the formation with a mixture of furfural, a urethane and a hydrochloric acid catalyst containing copper acetate, the mixture having a pH of approximately 7, and controlling the setting time of the mixture by the amount of hydrochloric acid and copper acetate catalyst used.

3. A method of plugging formations in wells including the step of impregnating the formation with a mixture of furfural, isobutyl urethane and a hydrochloric acid catalyst, the mixture having a pH of approximately 7, and controlling the time of setting of the mixture by the amount of hydrochloric acid catalyst used.

4. A method of plugging formations in wells including the step of impregnating the formation with a mixture of furfural, isobutyl urethane and a hydrochloric acid catalyst containing copper acetate, the mixture having a pH of approximately 7, and controlling the setting time of the mixture by the amount of hydrochloric acid and copper acetate catalyst used.

5. A method of plugging formations in wells including the step of impregnating the formation with a mixture of furfural, a commercial product of hexyl to decyl urethanes, and a hydrochloric acid catalyst, the mixture having a pH of approximately 7, and controlling the time of setting of the mixture by the amount of hydrochloric acid catalyst used.

6. A method of plugging formations in wells including the step of impregnating the formation with a mixture of furfural, a commercial product of hexyl to decyl urethanes, and a hydrochloric acid catalyst containing copper acetate, the mixture having a pH of approximately 7, and controlling the time of setting of the mixture by the amount of hydrochloric acid and copper acetate catalyst used.

7. A method of plugging limestone formations in wells including the step of impregnating the formation with a mixture of furfural, a urethane and a hydrochloric acid catalyst, the mixture being non-reactive toward limestone, and controlling the time of setting of the mixture by the amount of hydrochloric acid catalyst used.

8. A method of plugging limestone formations in wells including the step of impregnating the formation with a mixture of furfural, a urethane and a hydrochloric acid catalyst containing copper acetate, the mixture being non-reactive toward said limestone, and controlling the time of setting of the mixture by the amount of hydrochloric acid catalyst used.

9. A method of plugging limestone formations in wells including the step of impregnating the formation with a mixture of furfural, isobutyl urethane and a hydrochloric acid catalyst, the mixture being non-reactive toward limestone, and controlling the time of setting of the mixture by the amount of hydrochloric acid catalyst used.

10. A method of plugging limestone formations in wells including the step of impregnating the formation with a mixture of furfural, a commercial product of hexyl to decyl urethanes, and a hydrochloric acid catalyst, the mixture being non-reactive toward limestone, and controlling the time of setting of the mixture by the amount of hydrochloric acid catalyst used.

CLYDE H. MATHIS.
CARL RAMPACEK.